(12) United States Patent
Blaney et al.

(10) Patent No.: US 10,794,206 B2
(45) Date of Patent: Oct. 6, 2020

(54) CMC BOAS INTERSEGMENT SEAL

(71) Applicant: United Technologies Corporation, Farmington, CT (US)

(72) Inventors: Ken F. Blaney, Middleton, NH (US); Thomas E. Clark, Sanford, ME (US)

(73) Assignee: RAYTHEON TECHNOLOGIES CORPORATION, Farmington, CT (US)

( * ) Notice: Subject to any disclaimer, the term of this patent is extended or adjusted under 35 U.S.C. 154(b) by 150 days.

(21) Appl. No.: 16/122,525

(22) Filed: Sep. 5, 2018

(65) Prior Publication Data

US 2020/0072067 A1  Mar. 5, 2020

(51) Int. Cl.
| F01D 11/00 | (2006.01) |
| F01D 11/08 | (2006.01) |
| F01D 25/24 | (2006.01) |

(52) U.S. Cl.
CPC ............ F01D 11/005 (2013.01); F01D 11/08 (2013.01); F01D 25/246 (2013.01); F05D 2220/323 (2013.01); F05D 2230/232 (2013.01); F05D 2240/11 (2013.01); F05D 2240/55 (2013.01); F05D 2250/12 (2013.01); F05D 2300/6033 (2013.01)

(58) Field of Classification Search
CPC ........ F01D 11/005; F01D 11/08; F01D 11/12; F01D 11/14; F01D 25/246; F04D 29/526; F05D 2240/55; F05D 2220/323
See application file for complete search history.

(56) References Cited

U.S. PATENT DOCUMENTS

| 5,374,161 | A | 12/1994 | Kelch | |
| 5,988,975 | A | 11/1999 | Pizzi | |
| 7,534,086 | B2 | 5/2009 | Mazzola et al. | |
| 8,585,354 | B1 | 11/2013 | Liang | |
| 9,926,790 | B2 | 3/2018 | Landwehr et al. | |
| 2009/0169368 | A1* | 7/2009 | Schlichting | F01D 11/122 415/173.1 |
| 2012/0141257 | A1* | 6/2012 | Berche | F01D 11/005 415/177 |
| 2013/0017057 | A1* | 1/2013 | Lagueux | F01D 11/22 415/1 |
| 2013/0115065 | A1* | 5/2013 | Correia | F01D 11/005 415/182.1 |
| 2017/0254271 | A1* | 9/2017 | Hillier | F01D 5/284 |
| 2017/0370240 | A1* | 12/2017 | Sippel | F01D 11/005 |
| 2018/0195401 | A1 | 7/2018 | Sippel et al. | |

FOREIGN PATENT DOCUMENTS

| CA | 2987443 A1 * | 7/2018 | ............ F01D 11/005 |
| EP | 2960440 | 12/2015 | |

OTHER PUBLICATIONS

EP Search report for Application No. 19195722.4 dated Dec. 20, 2019.

* cited by examiner

*Primary Examiner* — Nathaniel E Wiehe
*Assistant Examiner* — Ryan C Clark
(74) *Attorney, Agent, or Firm* — Carlson, Gaskey & Olds, P.C.

(57) ABSTRACT

A blade outer air seal assembly includes a support structure. A blade outer air seal extends circumferentially about an axis and is mounted in the support structure. A flow guide has a plurality of flow guide segments arranged between the blade outer air seal and the support structure. An intersegment seal is at a circumferential end of at least one of the flow guide segments.

19 Claims, 7 Drawing Sheets

CMC BOAS INTERSEGMENT SEAL

BACKGROUND

This application relates to an intersegment seal for a blade outer air seal.

Gas turbine engines are known and typically include a compressor compressing air and delivering it into a combustor. The air is mixed with fuel in the combustor and ignited. Products of the combustion pass downstream over turbine rotors, driving them to rotate.

It is desirable to ensure that the bulk of the products of combustion pass over turbine blades on the turbine rotor. As such, it is known to provide blade outer air seals radially outwardly of the blades.

SUMMARY

In one exemplary embodiment, a blade outer air seal assembly includes a support structure. A blade outer air seal extends circumferentially about an axis and is mounted in the support structure. A flow guide has a plurality of flow guide segments arranged between the blade outer air seal and the support structure. An intersegment seal is at a circumferential end of at least one of the flow guide segments.

In a further embodiment of any of the above, the flow guide segments extend circumferentially to form an annulus about the axis. An intersegment seal is arranged between each of the flow guide segments.

In a further embodiment of any of the above, the intersegment seal has an anti-rotation feature in engagement with the flow guide.

In a further embodiment of any of the above, the anti-rotation feature is a protrusion that extends generally radially outward from the intersegment seal.

In a further embodiment of any of the above, the protrusion is generally rectangular shaped.

In a further embodiment of any of the above, the flow guide has a notch at the circumferential end for engagement with the anti-rotation feature.

In a further embodiment of any of the above, a gap is defined between the flow guide and the blade outer air seal. The intersegment seal fits into the gap at the circumferential end.

In a further embodiment of any of the above, the intersegment seal has an axial portion, a first radial portion, and a second radial portion each abutting the flow guide. The flow guide has a hook at a first axial end in engagement with the first radial portion of the intersegment seal.

In a further embodiment of any of the above, the flow guide has a lip at a second axial end in engagement with the second radial portion of the intersegment seal.

In a further embodiment of any of the above, the intersegment seal has a backer piece that extends from the second radial portion and in engagement with the lip.

In a further embodiment of any of the above, the backer piece is welded to the intersegment seal.

In a further embodiment of any of the above, a spacer is arranged between the flow guide and the blade outer air seal. The spacer has a notch that corresponds to the shape of the intersegment seal. The intersegment seal is in engagement with the spacer.

In a further embodiment of any of the above, the support structure has a first support member that engages a hook at a first axial side of the blade outer air seal. A second support member engages a lip at a second axial side of the blade outer air seal.

In a further embodiment of any of the above, the intersegment seal has a first radially extending portion engaged with the hook.

In a further embodiment of any of the above, the intersegment seal has a second radially extending portion engaged with the lip.

In a further embodiment of any of the above, the blade outer air seal is a ceramic matrix composite material.

In a further embodiment of any of the above, the blade outer air seal is a monolithic ceramic material.

In a further embodiment of any of the above, the intersegment seal is metallic.

In a further embodiment of any of the above, the intersegment seal is a ceramic matrix composite material.

In another exemplary embodiment, a turbine section for a gas turbine engine includes a turbine blade that extends radially outwardly to a radially outer tip and for rotation about an axis of rotation. A blade outer air seal extends circumferentially about the axis and is mounted in a support structure radially outward of the outer tip. The support structure has a first support member that engages a hook at a first axial side of the blade outer air seal. A second support member engages a lip at a second axial side of the blade outer air seal. A flow guide has a plurality of flow guide segments arranged circumferentially about the axis between the support structure and the blade outer air seal. The flow guide forms a gap between the flow guide and blade outer air seal. An intersegment seal is arranged between each of the flow guide segments. The intersegment seal has a first radial portion and a second radial portion joined by an axial portion. The first radial portion abuts the hook, the second radial portion abuts the lip, and the axial portion is in the gap.

These and other features may be best understood from the following drawings and specification.

DETAILED DESCRIPTION

Figure 1:
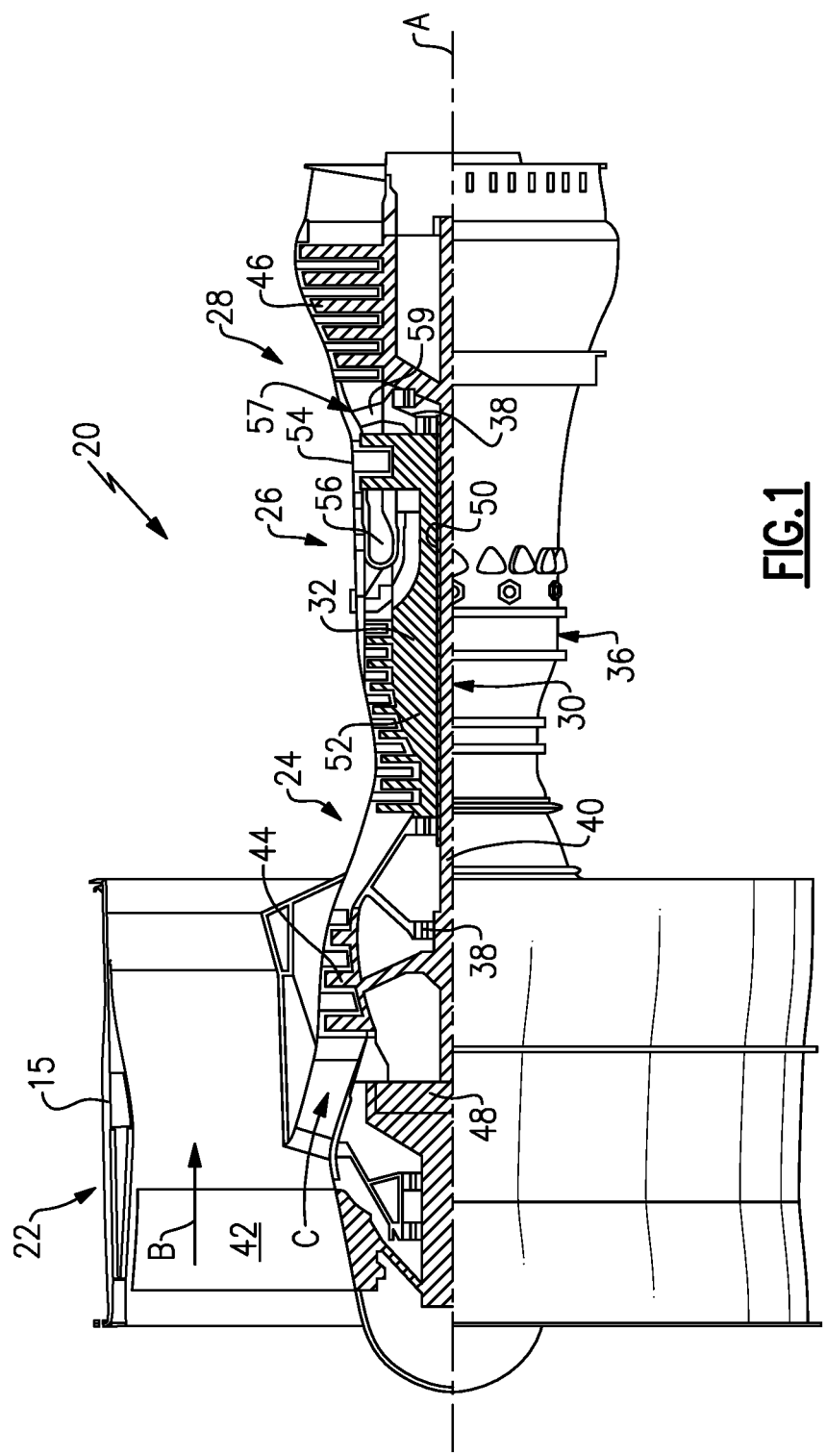
FIG. 1 schematically shows a gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. The fan section 22 drives air along a bypass flow path B in a bypass duct defined within a nacelle 15, and also drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects, a first (or low) pressure compressor 44 and a first (or low) pressure turbine 46. The inner shaft 40 is connected to the fan 42 through a speed change mechanism, which in exemplary gas turbine engine 20 is illustrated as a geared architecture 48 to drive a fan 42 at a lower speed than the low speed spool 30. The high speed spool 32 includes an outer shaft 50 that interconnects a second (or high) pressure compressor 52 and a second (or high) pressure turbine 54. A combustor 56 is arranged in exemplary gas turbine 20 between the high pressure compressor 52 and the high pressure turbine 54. A mid-turbine frame 57 of the engine static structure 36 may be arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The mid-turbine frame 57 includes airfoils 59 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of the low pressure compressor, or aft of the combustor section 26 or even aft of turbine section 28, and fan 42 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1 and less than about 5:1. It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet (10,668 meters). The flight condition of 0.8 Mach and 35,000 ft (10,668 meters), with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(Tram\ °\ R)/(518.7°\ R)]^{0.5}$. The "Low corrected fan tip speed" as disclosed herein according to one non-limiting embodiment is less than about 1150 ft/second (350.5 meters/second).

Figure 2:
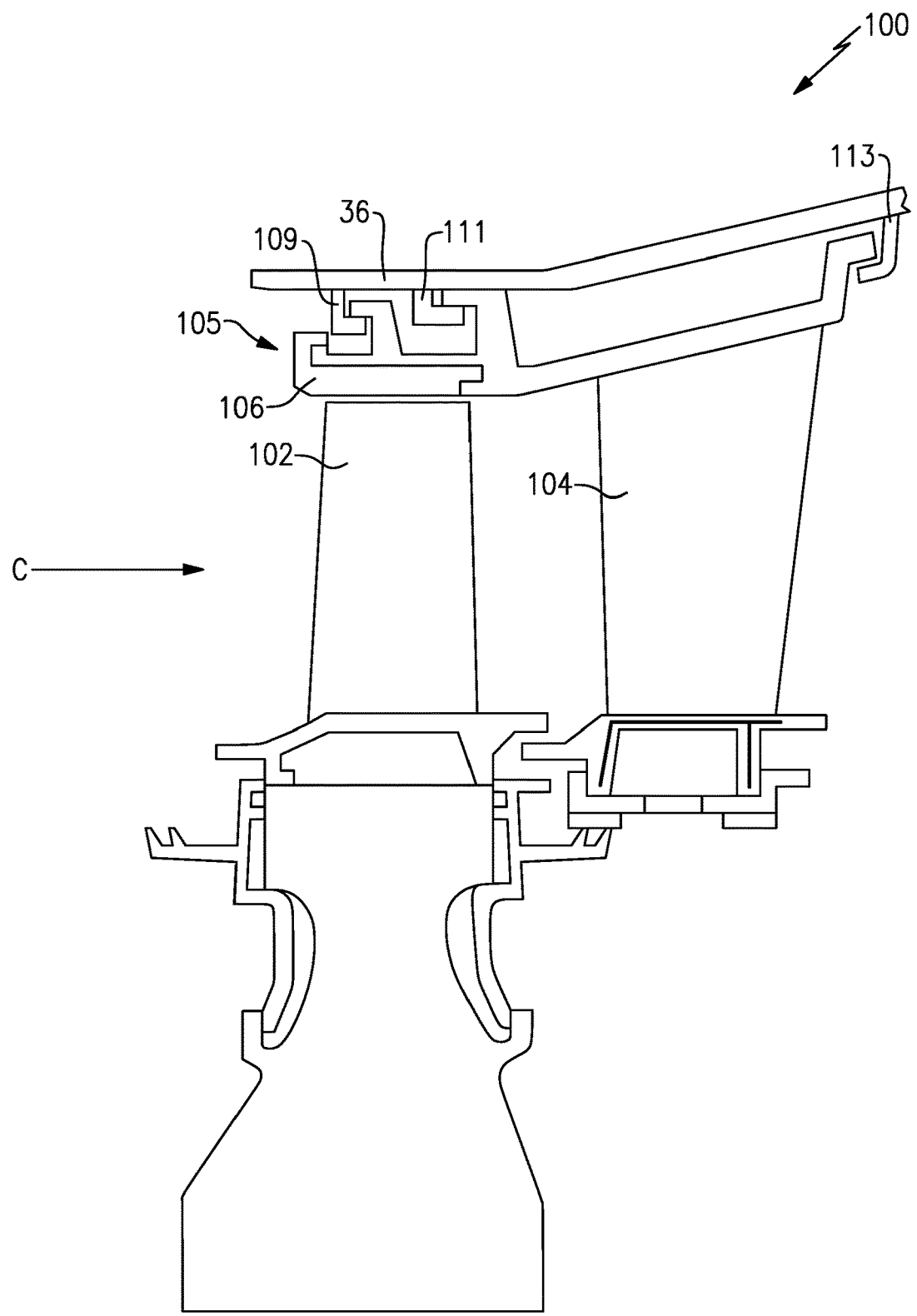
FIG. 2 schematically shows a portion of a turbine section.

FIG. 2 schematically illustrates a portion 100 of the turbine section 28. The portion 100 includes alternating series of rotating blades 102 and stationary vanes 104 that extend into the core flow path C of the gas turbine engine. Turbine blades 102 rotate and extract energy from the hot combustion gases that are communicated along the core flow path C of the gas turbine engine 20. The turbine vanes 104, which generally do not rotate, guide the airflow and prepare it for the next set of blades 102. As is known, it is desirable to pass the bulk of products of combustion downstream of the combustor section 26 across the turbine blades. Thus, an assembly 105 having a blade outer air seal ("BOAS") 106 is positioned slightly radially outwardly of the outer tip of the blades 102. It should be understood that the turbine section portion 100 could be utilized in other gas turbine engines, and even gas turbine engines not having a fan section at all.

The BOAS assembly 105 is attached to the engine static structure 36. The engine static structure 36 has a plurality of engagement features 109, 111, 113 for engagement with the BOAS assembly 105. In an embodiment, engagement features 109 and 111 are at an axial position between leading and trailing edges of the blade 102 and engagement feature 113 is aft of the vane 104. In another embodiment, engagement feature 111 is between the blade 102 and vane 104. Fewer or additional engagement features may be contemplated within the scope of this disclosure.

Figure 3:
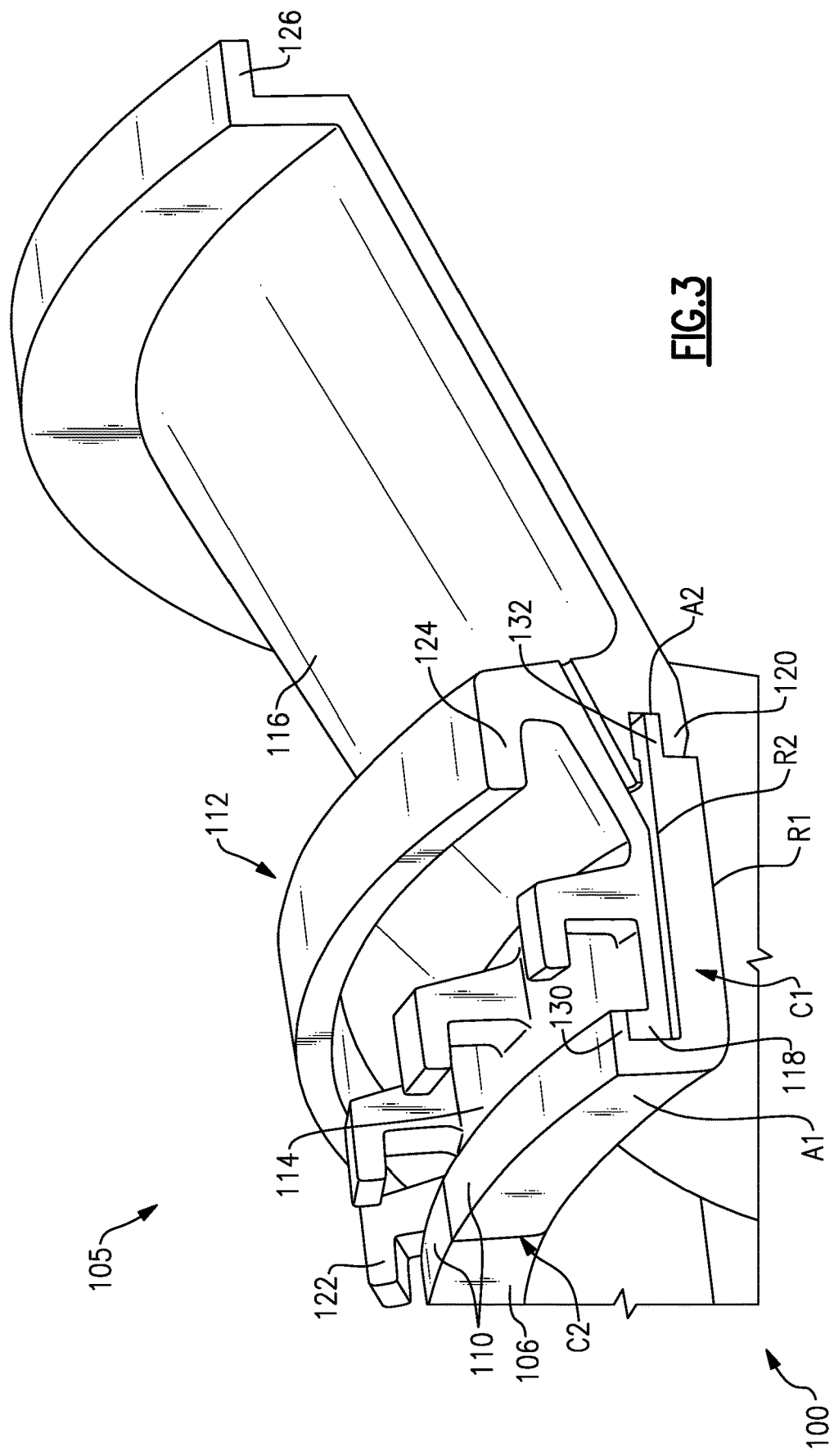
FIG. 3 shows a blade outer air seal assembly.

FIG. 3 shows the BOAS assembly 105. The assembly 105 includes the BOAS 106 which is made up of a plurality of seal segments 110 that are circumferentially arranged in an annulus around the central axis A of the engine 20. The seal segments 110 are mounted in a structure 112, which is circumferentially continuous about the central axis A. The BOAS 106 is in close radial proximity to the tips of the blades 102 to reduce the amount of gas flow that escapes around the blades 102.

The seal segments 110 may be monolithic bodies that are formed of a high thermal-resistance, low-toughness material, such as a ceramic matrix composite. In another embodiment, the seal segments 110 may be formed from another material, such as a metallic alloy or monolithic ceramic. BOAS seals that are ceramic matric composite, particularly 2D ply construction, may be difficult to mount in an engine. This disclosure may also apply to 3D and 4D ceramic matrix composite construction methods. The parts are designed so that the thermal expansion in the axial direction can more easily work with other part with different thermal expansion rations.

Each seal segment 110 is a body that defines radially inner and outer sides R1, R2, respectively, first and second circumferential ends C1, C2, respectively, and first and second axial sides A1, A2, respectively. The radially inner side R1 faces in a direction toward the engine central axis A. The radially inner side R1 is thus the gas path side of the seal segment 110 that bounds a portion of the core flow path C. The first axial side A1 faces in a forward direction toward the front of the engine 20 (i.e., toward the fan 42), and the second axial side A2 faces in an aft direction toward the rear of the engine 20 (i.e., toward the exhaust end).

The seal segments 110 are mounted in the structure 112, which includes a BOAS support portion 114 and a vane platform portion 116. The BOAS support portion 114 includes a first support member 118 that radially supports a hook 130 on the seal segment 110 at an axially forward portion of the structure 114 and a second support member 120 that radially supports a lip 132 on the seal segment 110 at an axially aft portion of the seal segment 110. The first support member 118 is the axially forward-most end of the structure 112. In an embodiment, the second support member 120 is the radially innermost portion of the structure 112.

The structure 112 may include a plurality of hooks for attachment to the engine static structure 36, for example. The structure 112 may include a plurality of discrete hooks 122 extending radially outward from the BOAS support portion 114. The hooks 122 engage the engagement feature 109 (shown in FIG. 2). The structure 112 may include a continuous hook structure aft of the BOAS 106. In the illustrated embodiment, an attachment member 124 extends radially outward from the structure 112 for attachment to the engine 20. The attachment member 124 may be at the same axially position as the second support member 120, or may forward or aft of the second support member 120. The attachment member 124 engages the engagement feature 111 (shown in FIG. 2). A vane platform attachment member 126 extends radially outward from the vane platform portion 116.

In the illustrated embodiment, the vane platform attachment member 126 is axially aft of the vane 104. The vane platform attachment member 126 may be the radially outermost portion of the structure 112. The attachment member 126 engages the engagement feature 113 (shown in FIG. 2). Each of the attachment members 122, 124, 126 has a generally radially extending portion and a generally axially extending portion. Although three attachment members 122, 124, 126 and three engagement members 109, 111, 113 are shown, more or fewer may come within the scope of this disclosure.

In this embodiment, the BOAS support portion 114 and vane platform portion 116 form a unified part. The metallic vane platform portion 116 may be used in conjunction with a CMC vane 104, so that the vane construction is multi-piece in nature. The BOAS support portion 114 is joined with the vane platform portion 116 to allow the architecture to seal more easily and use cooling air more efficiently. This architecture allows BOAS cooling air reuse so the cooling air can be used on an adjacent vane. Details of a support structure 112 are found in U.S. patent application Ser. No. 16/122,373, entitled "UNIFIED BOAS SUPPORT AND VANE PLATFORM" filed on even date herewith. Although a unified BOAS support portion 114 and vane platform portion 116 is illustrated, the disclosed assembly may be used in a BOAS support that is not integrated with a vane platform.

Figure 4:
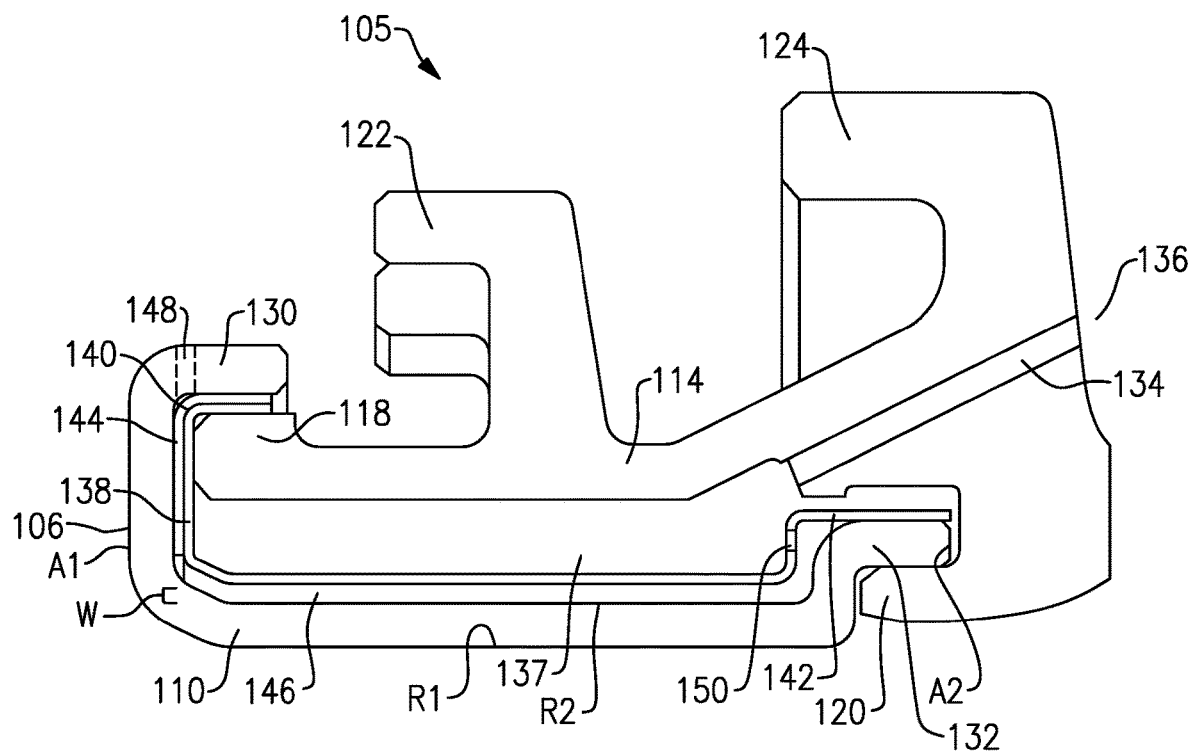
FIG. 4 shows a cross-sectional view through a blade outer air seal assembly.

FIG. 4 shows a cross-section of the blade outer air seal assembly 105. A hook 130 is formed in seal segment 110 of the BOAS 106 near the first axial side A1 for engagement with the first support member 118. The hook 130 is at a forward-most portion of the seal segment 110. The hook 130 includes a radially outwardly extending portion defining the first axial side A1 and an axially extending portion that extends aft of the first axial side A1. A lip 132 is formed in the seal segment 110 near the second axial side A2 for engagement with the second support member 120. The lip 132 extends generally axially from the seal segment 110. The BOAS 106 may be assembled in a forward to aft direction, as the hook 130 and lip 132 will be received in the first and second support members 118, 120, respectively.

A cooling air reuse port 134 extends between a vane chamber 136 and a BOAS chamber 137. The vane chamber 136 is formed between the vane platform portion 116 and the engine structure 36. The BOAS chamber 137 is formed between the BOAS support portion 114 and the BOAS 106. Cooling air enters the BOAS chamber 137 through an inlet 148 in the BOAS 106, and may be reused to cool the vane 104 by travelling through the cooling air port 134. In one embodiment, the port 134 extends generally axially. In another embodiment, the port 134 may be a different orientation, such as generally radially, depending on the orientation of the hooks 122 and attachment member 124. For example, the port 134 may extend generally perpendicular to the axis A. The support 112 may include a plurality of cooling air reuse ports 134 spaced circumferentially about the support 112. The cooling air may be reused in adjacent vanes, which improves cycle efficiency. This allows for less total cooling air to be used than a non-reuse configuration. Further, cooling air from several BOAS may be reused to cool a single vane.

The port 134 re-uses cooling air that has been used for forced convection back side cooling of the BOAS 106 to cool an adjacent vane 104. The used air can then be used to cool the adjacent vane 104 reducing the amount of cooling air required to be supplied by the compressor, which may improve engine cycle efficiency.

A flow guide 138 is arranged between the BOAS 106 and BOAS support portion 114. The flow guide 138 generally tracks the shape of the BOAS 106. The flow guide 138 has a hook 140 and lip 142 that generally correspond to a hook 130 and lip 132 on the BOAS 106. The flow guide 138 forces convection along the radial surface R2 of the BOAS 106. A spacer 144 may be arranged between the flow guide 138 and the BOAS 106. The spacer 144 defines and maintains a radially extending space between the spacer 144 and BOAS 106. A gap 146 is formed between the BOAS 106 and flow guide 138 having a width w, which is defined and maintained by the geometry of the flow guide 138. Cooling air enters the BOAS 106 through a BOAS inlet 148, then travels radially inward through the spacer 144 into the gap 146. Cooling air exits the gap 146 through an outlet 150 in the flow guide 138, and through the port 134. The flow guide 138 is made from a ceramic matrix composite compatible material, such as cobalt, or contains a ceramic matrix composite compatible coating. The flow guide 138 may be formed from sheet metal, for example. Details of a flow guide 138 and spacer 144 are found in U.S. patent application Ser. No. 16/122,431, entitled "CMC BOAS COOLING AIR FLOW GUIDE" filed on even date herewith.

Figure 5:
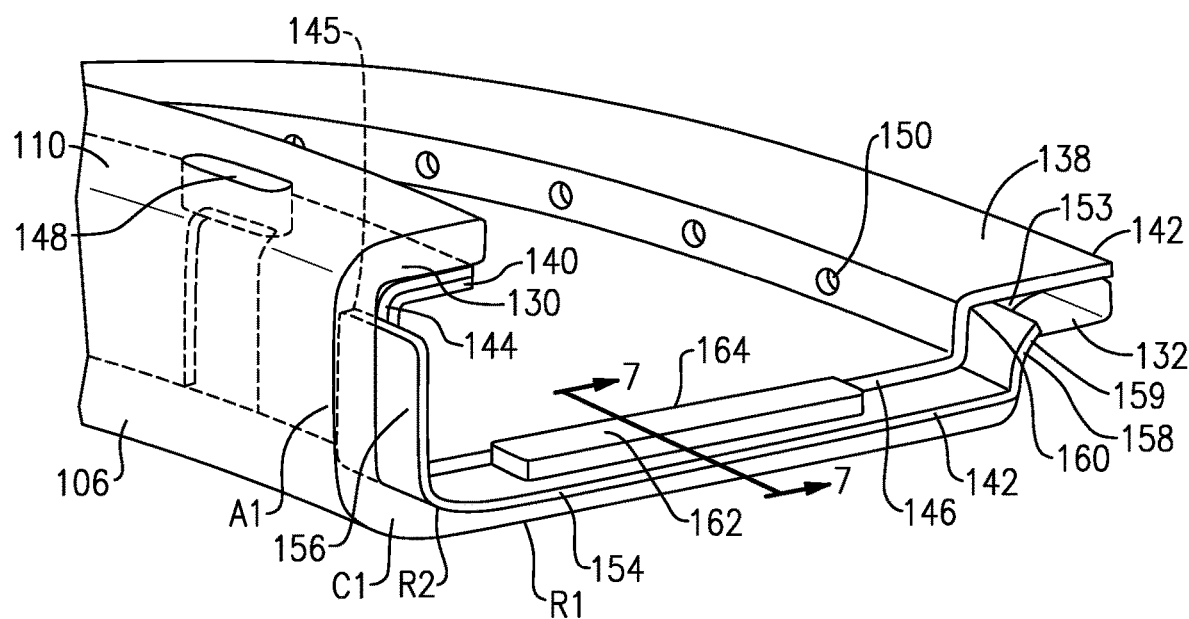
FIG. 5 shows a portion of the blade outer air seal assembly.

FIG. 5 shows a portion of the BOAS assembly 105 with an intersegment seal 152. The intersegment seal 152 fits at the first circumferential side C1 of the seal segment 110, and seals the gap between adjacent seal segments 110. The intersegment seal 152 fits between the flow guide 138 and the BOAS 106 between two adjacent seal segments 110 to seal the intersegment ends of each seal segment 110. In one example, the intersegment seal 152 is the same thickness as the spacer 144. The spacer 144 may have a notch 145 corresponding to the shape of the intersegment seal 152, and the intersegment seal 152 is in engagement with the notch 145.

The intersegment seal 152 has an axial portion 154 that extends in a generally axial direction and abuts the second radial side R2 of the BOAS 106. A first radial portion 156 extends in a generally radial direction. This first radial portion 156 is at a forward end of the axial portion 154 and abuts the hook 130 of the BOAS 106 and the hook 140 of the flow guide 138. A second radial portion 158 extends at an aft end of the axial portion 154 and abuts the lip 132 of the BOAS 106 and lip 142 of the flow guide 138.

A flow discourager 159 is incorporated into the second radial portion 158. The flow discourager 159 is generally curved aftward. However, other shapes may come within the scope of this disclosure. The flow discourager 159 is between the lip 132 of the BOAS 106 and the lip 142 of the flow guide 138. The geometry of the flow discourager 159 helps minimize leakage in the space left between the BOAS 106 and flow guide 138.

There may be manufacturing limitations for the BOAS 106, such as the radius 153 near the lip 132. For example, there are limitations on how small the radius 153 can be on a ceramic matrix composite BOAS 106. The flow discourager 159 is shaped to minimize such leakage.

In some embodiments, the flow guide 138 includes a backer piece 160. This backer piece 160 decreases the size of the gap 146 between the BOAS 106 and the flow guide 138 near the radius 153. The backer piece 160 may be welded to the flow guide 138, for example.

The intersegment seal 152 may include an anti-rotation feature 162 that fits into a notch 164 on the flow guide 138. The anti-rotation feature 162 protrudes generally radially outward from the axial portion 154 to engage with the notch 164. This engagement prevents the intersegment seal 152 from shifting in the assembly 105. In an embodiment, a top surface of the anti-rotation feature 162 is flush with a surface of the flow guide 138. In another embodiment, the anti-rotation feature 162 may be above or below the surface of the flow guide 138. In the illustrated embodiment, the anti-rotation feature 162 is generally rectangular in shape. However, the anti-rotation feature 162 may be other shapes, such as rounded. In one embodiment, the anti-rotation feature 162 is flat stock welded to the intersegment seal 152. In another embodiment, the anti-rotation features 162 is a channel. The notch 164 and anti-rotation feature 162 have complementary shapes. The anti-rotation feature 162 allows the flow guide 138 to span multiple seal segments 110 for reduced leakage, since the anti-rotation feature 162 engages with the flow guide 138, rather than the BOAS 106. Thus, in some examples, there may be fewer flow guide segments than BOAS seal segments 110.

Figure 6:
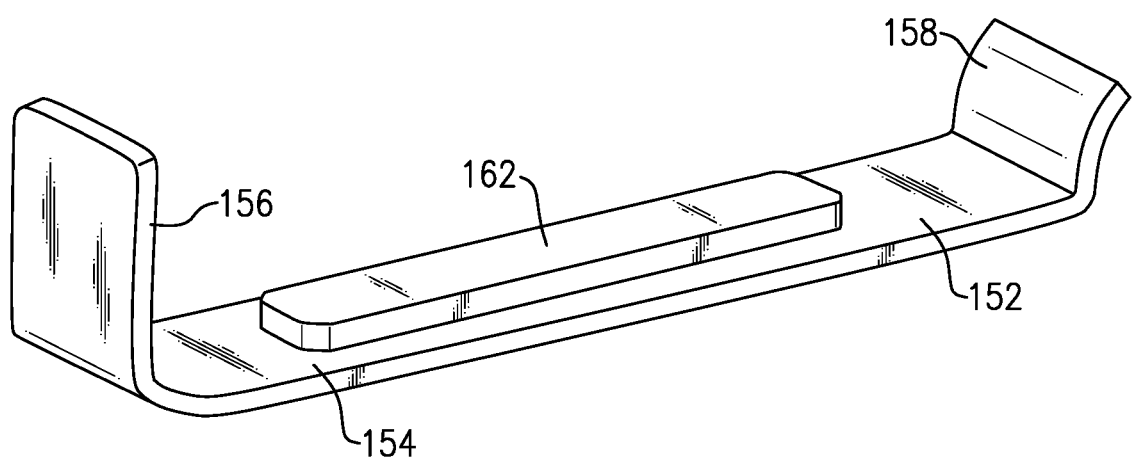
FIG. 6 shows an intersegment seal for a blade outer air seal assembly.

FIG. 6 shows the intersegment seal 152. The first and second radial portions 156, 158 and axial portion 154 generally form a C shape. The intersegment seal 152 may be a metallic material or may a ceramic matrix composite material. The intersegment seal 152 is more robust in size and nature than known feather seals, which are used for metal BOAS. The intersegment seal 152 takes advantage of the space left by the ceramic matrix composite BOAS 106, and fills a larger area than feather seals.

Figure 7A:
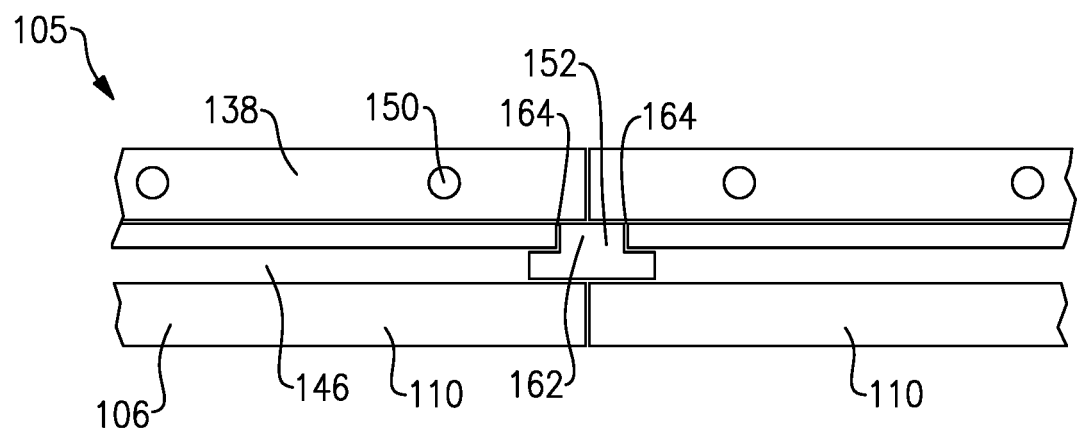
FIG. 7A shows a cross section taken along line 7-7 of the blade outer air seal assembly according to an embodiment.

FIG. 7A schematically shows a cross-section taken along line 7-7 of FIG. 5. The intersegment seal 152 fits between the flow guide 138 and the BOAS 106 between flow guide segments. In this illustration, the flow guide segments align with BOAS seal segments 110. Cooling air may leak from the gap 146 between BOAS seal segments 110 or between flow guide segments. The intersegment seal 152 helps prevent leakage at these spots. Each segment of the flow guide 138 has a notch 164 for engagement with the anti-rotation feature 162.

Figure 7B:
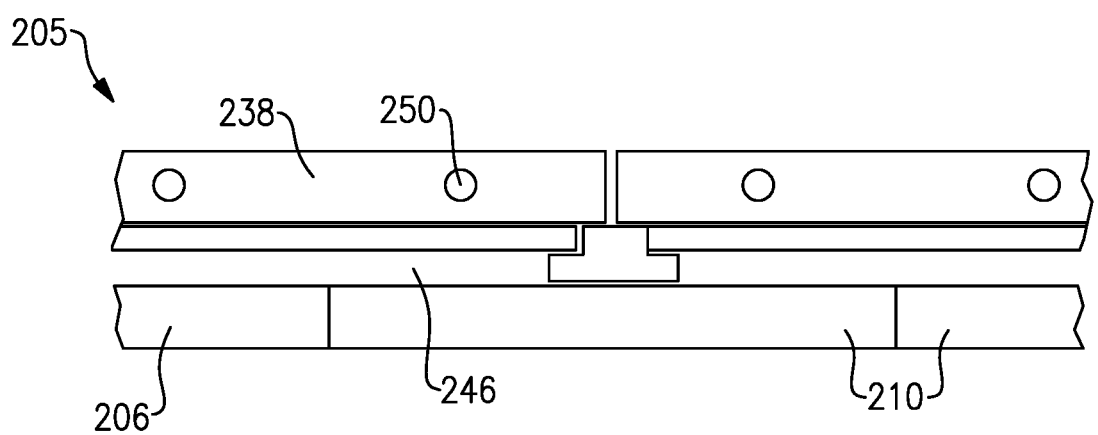
FIG. 7B shows a cross section of the blade outer air seal assembly according to an embodiment.

FIG. 7B schematically shows a cross-section taken along line 7-7 of another example assembly 205. In this example, segments of the flow guide 238 are offset from the BOAS seal segments 210. An intersegment seal 252 is arranged between each flow guide 238. The offset flow guide segments and seal segments 210 may provide better sealing. This arrangement also allows for a different number of flow guide segments and seal segments 210 about the engine central axis A. In one example, flow guide segments may be longer than BOAS seal segments 210, so the assembly 205 includes fewer flow guide segments than BOAS seal segments 210.

Although an embodiment of this invention has been disclosed, a worker of ordinary skill in this art would recognize that certain modifications would come within the scope of this disclosure. For that reason, the following claims should be studied to determine the true scope and content of this disclosure.

The invention claimed is:

1. A blade outer air seal assembly, comprising:
   a support structure;
   a blade outer air seal extending circumferentially about an axis and mounted in the support structure;
   a flow guide having a plurality of flow guide segments arranged between the blade outer air seal and the support structure; and
   an intersegment seal at a circumferential end of at least one of the flow guide segments, wherein the intersegment seal has an anti-rotation feature in engagement with the flow guide.

2. The blade outer air seal assembly of claim 1, wherein the flow guide segments extend circumferentially to form an annulus about the axis, and an intersegment seal is arranged between each of the flow guide segments.

3. The blade outer air seal assembly of claim 1, wherein the anti-rotation feature is a protrusion extending generally radially outward from the intersegment seal.

4. The blade outer air seal assembly of claim 3, wherein the protrusion is generally rectangular shaped.

5. The blade outer air seal assembly of claim 1, wherein the flow guide has a notch at the circumferential end for engagement with the anti-rotation feature.

6. The blade outer air seal assembly of claim 1, wherein a gap is defined between the flow guide and the blade outer air seal, and the intersegment seal fits into the gap at the circumferential end.

7. The blade outer air seal assembly of claim 1, wherein a spacer is arranged between the flow guide and the blade outer air seal, wherein the spacer has a notch corresponding to the shape of the intersegment seal, and the intersegment seal is in engagement with the spacer.

8. The blade outer air seal assembly of claim 1, wherein the support structure has a first support member engaging a hook at a first axial side of the blade outer air seal and a second support member engaging a lip at a second axial side of the blade outer air seal.

9. The blade outer air seal assembly of claim 8, wherein the intersegment seal has a first radially extending portion engaged with the hook.

10. The blade outer air seal assembly of claim 8 wherein the intersegment seal has a second radially extending portion engaged with the lip.

11. The blade outer air seal assembly of claim 1, wherein the blade outer air seal is a ceramic matrix composite material.

12. The blade outer air seal assembly of claim 1, wherein the blade outer air seal is a monolithic ceramic material.

13. The blade outer air seal assembly of claim 1, wherein the intersegment seal is metallic.

14. The blade outer air seal assembly of claim 1, wherein the intersegment seal is a ceramic matrix composite material.

15. A blade outer air seal assembly, comprising:
a support structure;
a blade outer air seal extending circumferentially about an axis and mounted in the support structure;
a flow guide having a plurality of flow guide segments arranged between the blade outer air seal and the support structure; and
an intersegment seal at a circumferential end of at least one of the flow guide segments wherein the intersegment seal has an axial portion, a first radial portion, and a second radial portion each abutting the flow guide and the flow guide has a hook at a first axial end in engagement with the first radial portion of the intersegment seal.

16. The blade outer air seal assembly of claim 15, wherein the flow guide has a lip at a second axial end in engagement with the second radial portion of the intersegment seal.

17. The blade outer air seal assembly of claim 16, wherein the intersegment seal has a backer piece extending from the second radial portion and in engagement with the lip.

18. The blade outer air seal assembly of claim 17, wherein the backer piece is welded to the intersegment seal.

19. A turbine section for a gas turbine engine, comprising:
a turbine blade extending radially outwardly to a radially outer tip and for rotation about an axis of rotation;
a blade outer air seal extending circumferentially about the axis and mounted in a support structure radially outward of the outer tip, wherein the support structure has a first support member engaging a hook at a first axial side of the blade outer air seal and a second support member engaging a lip at a second axial side of the blade outer air seal;
a flow guide having a plurality of flow guide segments arranged circumferentially about the axis between the support structure and the blade outer air seal, wherein the flow guide forms a gap between the flow guide and blade outer air seal;
an intersegment seal arranged between each of the flow guide segments, the intersegment seal having a first radial portion and a second radial portion joined by an axial portion, wherein the first radial portion abuts the hook, the second radial portion abuts the lip, and the axial portion is in the gap; and
a spacer arranged between the flow guide and the blade outer air seal, wherein the spacer has a notch corresponding to the shape of the intersegment seal, and the intersegment seal is in engagement with the spacer.

* * * * *